United States Patent [19]
Walter

[11] 3,922,950
[45] Dec. 2, 1975

[54] REVERSIBLE PATTERN-TRACING CONTROL FOR A DUPLICATING MILLING MACHINE

[76] Inventor: James E. Walter, c/o Columbus Impression Die Co., Inc., 6211 Shamrock Lane, Amlin, Ohio 43002

[22] Filed: Mar. 1, 1974

[21] Appl. No.: 447,147

[52] U.S. Cl. .............................................. 90/13.2
[51] Int. Cl.² ......................................... B23C 1/16
[58] Field of Search.................. 90/13.2, 13.5, 13.8; 51/100 R

[56] References Cited
UNITED STATES PATENTS

| | | | |
|---|---|---|---|
| 2,047,013 | 7/1936 | Dorn | 90/13.2 |
| 2,331,337 | 10/1943 | Meyer | 51/100 R |
| 3,174,403 | 3/1965 | McCoy | 90/13.5 |
| 3,446,116 | 5/1969 | Kelsey | 90/13.5 |

*Primary Examiner*—Donald R. Schran
*Assistant Examiner*—Leon Gilden
*Attorney, Agent, or Firm*—William S. Rambo

[57] ABSTRACT

An hydraulic pattern-tracing control for a duplicating milling machine operable selectively to cause the milling machine to either reproduce a workpiece identical in shape to that of a master pattern, or a workpiece which is a mirror image, or a right-to-left reverse image, of the master pattern. The pattern-tracing control disclosed herein features a stationarily supported master pattern and a closed circuit hydraulic pump and motor system operable in response to the movement of the workpiece-supporting table of the milling machine to cause the tracer stylus of the milling machine to move in either the same direction as the table, or in the opposite direction, to thus cause the cutter of the milling machine to either reverse or duplicate the image of the master pattern in a workpiece supported on the table of the milling machine.

1 Claim, 2 Drawing Figures

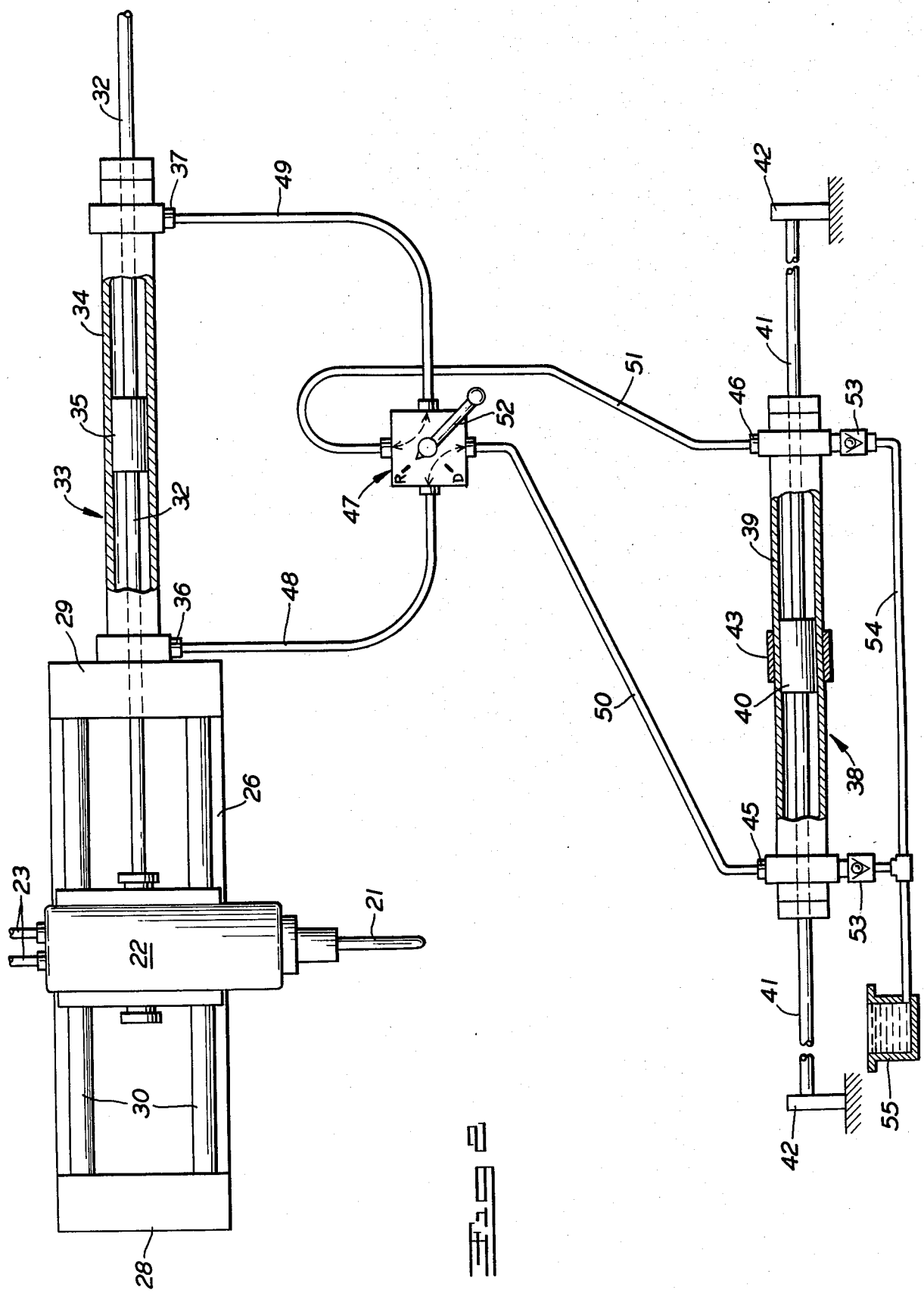

REVERSIBLE PATTERN-TRACING CONTROL FOR A DUPLICATING MILLING MACHINE

BACKGROUND OF THE INVENTION

This invention pertains to milling machines and more particularly to duplicating milling machines of the type that are operable to produce a duplicate of a master pattern by the coordinated movement of a pattern tracing stylus and a rotary cutting or milling tool.

Duplicating milling machines are well-known in the art. Typically, these machines comprise a rotary cutting or milling tool carried in a spindle that is mounted over a workpiece-supporting table for both vertical and latitudinal movement with respect to the table. The workpiece-supporting table is, in turn, arranged for longitudinal movement with respect to the milling tool. A pattern tracing stylus is hydraulically and/or mechanically coupled with the cutting tool spindle or head of the machine and is arranged to trace a three dimensional pattern positioned on the movable table of the machine adjacent the workpiece. Movement of the tracing stylus is transmitted to the spindle or head of the machine in a manner to cause the cutting tool to mill or cut a duplicate of the master pattern in the workpiece or blank.

Most duplicating milling machines are designed to produce a duplicate image of the master pattern. However, certain milling machines have heretofore been proposed for producing a "mirror" or "left-hand" image of a master pattern. However, the prior art left-hand or reverse image milling machines with which I am familiar are either unnecessarily complicated and expensive, or are characterised by inefficient high tolerance mechanical linkages between the pattern tracing stylus and the milling tool which cause undesirable dimensional variations in the milled workpiece. Typical examples of these prior art left-hand or reverse image milling machines are shown and described in U.S. Pat. Nos: 2,303,956 (Rossbacher); 2,831,405 and 2,858,743 (Sallwey et al.); 2,962,940 and 2,962,942 (Laurent).

SUMMARY AND OBJECTS OF THE INVENTION

The present invention provides a comparatively simple, yet highly efficient, hydraulic control system for attachment to a duplicating milling machine to enable the machine to produce either a duplicate or a left-hand reverse image of a single master pattern. In substance, the present control system comprises a reciprocal hydraulic pump movable with the workpiece-supporting table of the milling machine and hydraulically connected through a reversing valve with a reciprocal hydraulic motor connected to move the patterntracing unit of the machine either in the same direction of longitudinal movement as that of the workpiece-supporting table, or in the opposite direction, whereby to cause the milling tool, which is "slaved" to the pattern-tracing unit, to cut either a left-hand reverse image of the master pattern or a duplicate thereof, depending upon the manually selected position of the reversing valve.

The principal object of this invention is to provide a comparatively inexpensive, yet mechanically efficient, hydraulic control which may be easily attached to a duplicating milling machine for the purpose of adapting the machine for left-hand or reverse image reproduction of a master pattern, as well as duplicate image reproduction of such pattern.

Another object is to provide a reversible pattern-tracing control which may be easily field installed on a conventional duplicating milling machine without requiring substantial modification of the machine.

A further object is to provide a reversible pattern-tracing control which operates on the principle of a closed hydraulic circuit to precisely reproduce either a duplicate or a left-hand reverse image of a given master pattern without dimensional tolerances, such as might be caused by a mechanical linkage coupling between the tracing stylus and the cutting tool of the type proposed in the prior art.

For a further and more detailed understanding of this invention and additional objects and advantages thereof, reference is made to the following description and drawings of a preferred embodiment to the invention.

BRIEF DESCRIPTION OF DRAWINGS

FIG. 2 is a diagrammatic view of the hydraulic circuit of the present pattern-tracing control.

Figure 1:
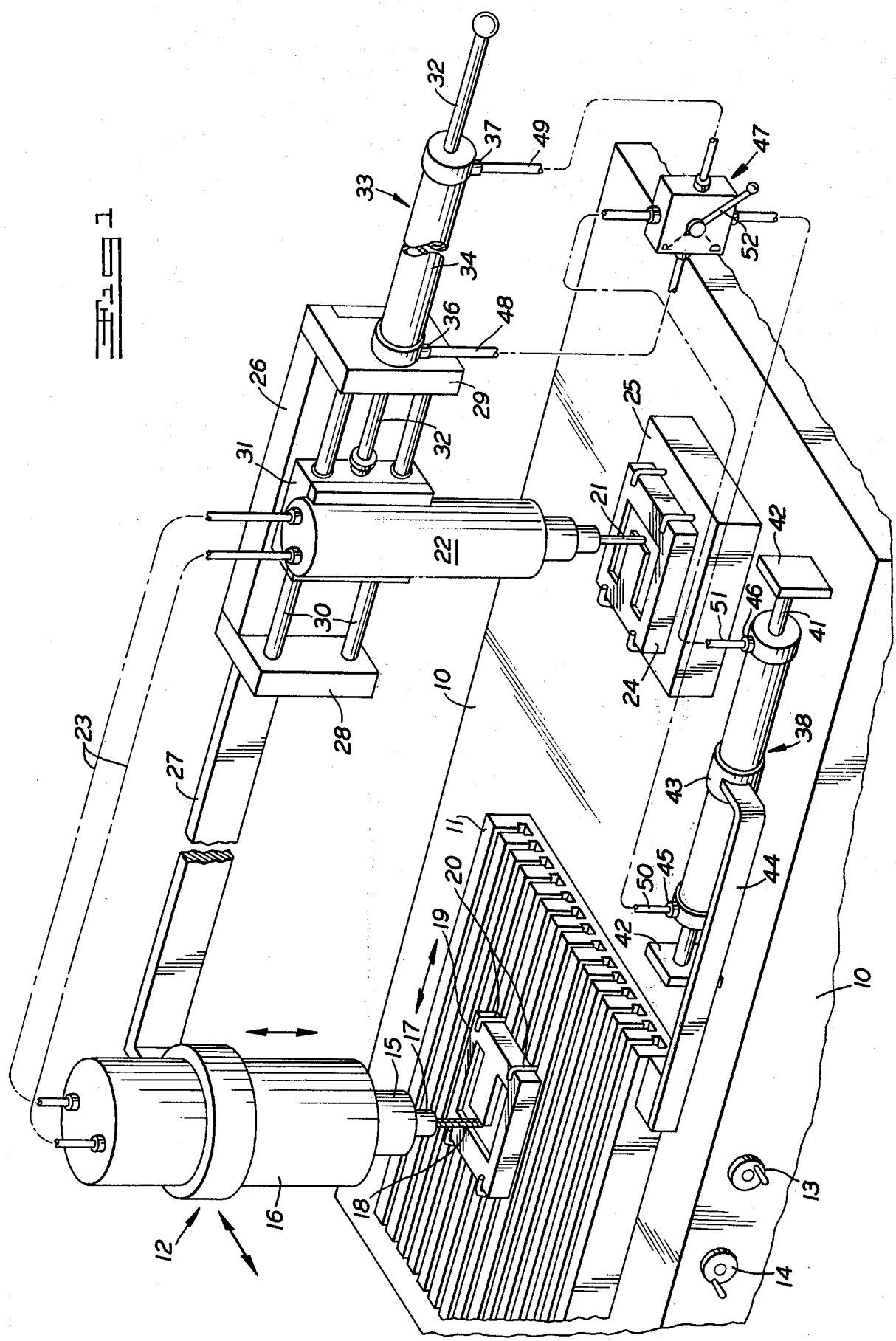
FIG. 1 is a schematic perspective view illustrating the present pattern-tracing control in diagrammatic, functional relationship to the essential parts of a duplicating milling machine.

DETAILED DESCRIPTION OF PREFERRED EMBODIMENT:

Referring now to FIG. 1, reference numeral 10 designates generally the stationary base frame or bed of a conventional duplicating milling machine. The machine also includes a work-supporting table 11 which is supported on the bed for transverse reciprocating movement beneath the cutter head 12 of the machine. In the usual manner, the table 11 is movable transversely or laterally back and forth by means of a hand wheel 13, whereas the cutter head 12 of the machine may be moved back and forth along a line perpendicular to the line of movement of the table 11 by means of a second hand wheel 14. The motion transmitting mechanisms which connect the table 11 for movement with the hand wheel 13 and the cutter head 12 for movement with the second hand wheel 14 are conventional and a detailed description and illustration thereof are believed unnecessary, since such mechanisms are well and familiarly known to those having ordinary knowledge of the machine tool art. Suffice it to say that such motion transmissions may be either mechanical, hydraulic, or electric, or combinations thereof.

The cutter head 12 of the milling machine is also conventional and comprises a rotary, motor-driven spindle 15 rotatably carried in a casing 16 and carrying at its lower end a tool-clamping chuck 17. A rotary milling or cutting tool 18 is detachably carried in the chuck 17 for milling a workpiece 19 secured to the upper surface of the table 11 by means of a plurality of detachable, hold-down clamps or hooks 20. The tool spindle 15 and the cutting tool 18, in addition to being driven in axial rotation, are also arranged for vertical or up and down reciprocation in response to corresponding up or down movement of a tracer bit or stylus 21 which forms the lower extremity of a hydraulic pattern-tracing unit 22. Again, the pattern-tracing unit 22 forms a part of the conventional duplicating milling machine and its operation and function are well-known. Suffice it to say that the vertically movable stylus of the pattern-tracing unit 22 is hydraulically coupled with the spindle 15 of the cutter head 12, so as to cause the cutting tool 18 to move vertically up or down in unison with and to the same extent as the tracing stylus. In other words, the cutting tool is slaved to the tracing stylus by an appropriate hydraulic coupling circuit indicated diagrammatically by the broken lines 23 in FIG. 1, so that the depth of cut of the cutting or milling tool 18 into the workpiece 19 will correspond identically to the contours and recesses of a master pattern 24 over which the point of the stylus moves. The master pattern 24 is rigidly but detachably supported on a block or table 25 fixed to the bed 10 of the machine.

It should here be understood that in the conventional duplicating milling machine, the pattern tracing unit 22 is connected for unified movement with the cutter head 12 of the machine, and the master pattern is normally mounted upon the movable work table 11 so as to move with the table along a line transverse to the direction of movement of the tracing unit. However, according to this invention, the master pattern 24 is stationarily secured to the bed of the milling machine in spaced relation to the work-supporting table 11 and the tracing unit 22 is detached from the cutter head 12 of the machine and mounted for reciprocation within an adaptor guide bracket 26 along a line parallel to the line of movement of the work-supporting table 11. The adaptor bracket 26 is, in turn, connected by an arm 27 to the cutter head 12 for back and forth movement therewith. Thus, in the present control, the tracing unit 22 is arranged for movement both transversely and longitudinally with respect to the stationary master pattern 24, and the tracing stylus 21 of the tracing unit is additionally movable vertically up and down in a third dimension with respect to the master pattern 24 and the bed 10 of the machine.

The adaptor bracket 26 includes a pair of relatively spaced end walls or plates 28 and 29 which carry between them a pair of relatively spaced, parallel guide rods or shafts 30. Slidable on the guide rods 30 is a travelling block 31 to which the tracing unit 22 is securely fastened. Connected to the block 31 between the rods 30 is the outer end of a piston rod 32 of a two-way, reciprocal hydraulic ram or motor 33. The motor 33 includes a cylinder 34 which is rigidly fastened at one end thereof to the end plate 29 of the adaptor bracket 26, and a piston 35 slidable within the cylinder 34 between opposite inlet-outlet ports 36 and 37. As shown in FIG. 2, the piston 35 of the motor 33 is rigidly connected with the piston rod 32, and the rod 32 extends outwardly from each end of the piston through openings formed in the end walls of the cylinder 34, so as to balance the pressure-responsive working areas at the opposite ends of the piston 35.

The hydraulic motor 33 is operated by a reciprocal, two-way hydraulic pump 38 which is responsive to the movement of the work-supporting table 11 of the machine to displace hydraulic fluid to and from the motor 33. Toward this end, the pump 38 may comprise an axially movable cylinder 39 having a piston 40 carried on the intermediate portion of a stationary piston rod 41. The opposite ends of the piston rod 41 extend through openings in the end walls of the cylinder 39 and are rigidly connected with brackets 42 fastened to the bed 10 of the milling machine. The pump cylinder 39 is carried in a clamping collar 43 mounted at one end of a connecting rod or strap 44 whose opposite end is rigidly secured to the work-supporting table 11. The pump cylinder 39 is thus arranged to move back and forth with the table 11 while the piston 40 and piston rod 41 remain stationary. The cylinder 39 is also provided toward the opposite ends thereof with inlet-outlet ports 45 and 46 which communicate with the opposite internal working chambers of the cylinder 39.

Connected between the inlet-outlet ports of the pump 38 and the ports of the motor 33 is a two position, four-way reversing valve 47. The valve 47 has four ports connected, respectively with the inlet-outlet ports 36 and 37 of the motor 33 and with the inlet-outlet ports 45 and 46 of the pump 38 by flexible conduits or hoses 48, 49, 50 and 51. The valve 47 is provided with a manually operable handle 52 which may be selectively moved between position "R" and "D" to either connect port 45 with port 36 while connecting ports 46 and 37, or to connect port 45 with port 37 while connecting port 46 with port 36.

It will thus be seen that regardless of the selected position of the valve 47, the motor 33 is in closed hydraulic circuit with the pump 38. Since the dimensions of the piston 35 and cylinder 34 of the motor 33 are identical to the corresponding dimensions of the piston 40 and cylinder 39 of the pump, and since the diameters of the piston rods 32 and 41 are the same, the piston rod 32 of the motor 33 will move the same distance as the cylinder 39 of the pump in response to movement of the work-supporting table 11. Also, since the cylinder 39 is connected to move directly with the table 11, the piston rod 32 and the tracing unit 22 carried thereby are caused to move a linear distance exactly equal to the linear movement of the table 11. The position of the valve 47 may be selected to cause the tracing unit 22 to be moved either in the same direction as the table 11, or in the opposite direction.

While the hydraulic circuit for the pump 38 and motor 33 is substantially a closed one, it is nevertheless provided with means for automatically replenishing or making up any hydraulic fluid which might be lost from the circuit due to leakage. This make-up means is shown diagrammatically in FIG. 2 and comprises check valves 53 connected with each of the inlet-outlet ports 45 and 46 of the pump cylinder 39. The check valves are arranged to open only inwardly of the cylinder 39 in response to subatmospheric pressures within the hydraulic circuit, such as might result from the presence of air in the system combined with movement of the cylinder 39. The inlets of the check valves 53 communicate with a flexible manifold conduit or hose 54 leading from a hydraulic fluid supply tank or reservoir 55. Thus, should subatmospheric or vacuum pressures occur in either of the chambers of the pump cylinder upon movement thereof, make-up fluid will be immediately drawn into the system through the adjacent check valve 53 to insure a "full" circuit at all times.

OPERATION

FIGS. 1 and 2 of the drawings illustrate the present pattern-tracing control and its associated milling machine in condition for milling a left-hand or mirror image of the master pattern 24 in the workpiece 19. This condition is attained by placing the selector handle 52 of the valve 47 at position "R" to thus connect ports 36 and 37 od the motor 33 with ports 45 and 46, respectively, of the pump 38.

The master pattern 24 and workpiece 19 are properly indexed with respect to the tracing stylus 21 and the milling tool 18 to insure that the pattern and workpiece are within the limits of movement of the tracing unit 22 and the cutter head 16 of the milling machine. The pattern and workpiece are then securely anchored to their respective supporting tables 25 and 11. The machine is now ready for milling operations, and the operator simply manipulates the hand wheels 13 and 14 of the milling machine to cause the tracing stylus 21 to move both longitudinally and latitudinally over the master pattern 24 to thus trace the outline and contours of the pattern. Actually, the handwheel 14 is coupled to control reciprocation of the cutter head 16 in a longitudinal direction, but since the adaptor bracket 26 is connected with the cutter head of the machine, the tracing unit will also move longitudinally in the same direction and to the same extent as the cutter head 16. In other words, the tracing stylus 21 and the cutting or milling tool 18 are coupled for unified movements in both longitudinal and vertical planes. However, the cutter head 16 of the machine is not movable in a latitudinal direction as is the tracing unit 22 and its stylus 21. To the contrary, the work-supporting table 11 and the workpiece 19 which is anchored thereto are arranged to move latitudinally relative to the cutter head 16 and cutting tool 18. Since the pump cylinder 39 is connected by the strap 44 to move directly with the table 11, and since the motor 33 is identical in size and volumetric capacity to the pump 38, the motor 33 will move the tracing unit 22 and tracing stylus 21 in a latitudinal direction and to the same extent as the table 11 moves. With the valve 47 in the R position the tracing unit 22 will move in the same latitudinal direction as the table 11 and workpiece 19. With the valve 47 in the D position, the tracing unit 22 will be moved in the opposite latitudinal direction, but to the same extent as the table 11. This reversal in direction of latitudinal movement of the tracing unit 22 with respect to the table 11, upon shifting the handle 52 of the valve 47 from R to D position, may be readily understood by visualizing the flow or displacement of hydraulic fluid to and from the pump 38 and to and from the motor 33 upon movement of the table 11 and cylinder 39 of the pump 38 in either latitudinal direction relative to the stationary piston 40 of the pump 38, with the valve 47 in a given position (see particularly FIG. 2).

Thus, with the selector handle 52 of the valve 47 positioned on R, relative movement between the workpiece 19 and the cutting tool 18 in a latitudinal direction is opposite that of the tracing stylus relative to the pattern 24. This causes the cutting tool 18 to mill a left-hand or mirror image of the pattern 24 in the workpiece 19. Conversely, with the handle 52 of the valve in the D position, the tracing unit 22 will move latitudinally in a direction opposite that of the work-supporting table 11 to thus cause the tool 18 to mill a duplicate image of the master pattern 24.

As previously stated, vertical up and down movement of the cutting tool 18 is controlled by a corresponding up and down movement of the tracing stylus 21 as it passes over the different elevations of the master pattern 24. The tip of the stylus 21 is preferably rounded so that it may cam upward as it contacts an abrupt shoulder or other steeply elevated area on the master pattern 24.

In view of the foregoing, it will be seen that this invention provides a comparatively simple, yet dimensionally precise hydraulic pattern-tracing control which may be easily attached to a conventional duplicating milling machine to adapt the machine for the milling of left-hand or mirror images as well as duplicate images of a three dimensional pattern. The present reversible tracing control may be attached to the conventional milling machine without substantial structural modification to the machine, and may be supplied at a fraction of the increase in cost of duplicating milling machines having built-in reverse image features.

While a single preferred embodiment of this invention has been illustrated and described in detail, it should be understood that various modifications in details of construction and design are possible without departing from the spirit of the invention as defined by the following claims.

What is claimed is:

1. In combination with a duplicating milling machine which includes a work-supporting table arranged for transverse movement beneath a longitudinally and vertically movable, rotary cutting tool and a pattern-tracing unit disposed in laterally spaced relation to said cutting tool but coupled for vertical and longitudinal movement with said cutting tool; that improvement which comprises: means for stationarily supporting a three dimensional pattern beneath the pattern-tracing unit of said machine; a reciprocative hydraulic motor connected with the pattern-tracing unit of said machine and operable to reciprocate said unit in a direction transverse to the longitudinal direction of movement of said cutting tool; pump means connected with the work-supporting table of said machine and hydraulically connected to transfer fluid under pressure to and from said motor in response to movement of said work-supporting table, said motor and pump means comprising cylinder-piston units of equal volumetric displacement connected in a closed hydraulic circuit; and a selector valve connected in the hydraulic circuit between said motor and pump means and operable selectively to reverse the direction of flow of fluid to and from said motor and pump means, and thereby to cause said milling machine to produce either a direct image or a mirror image of a pattern stationarily supported beneath the tracing unit of said machine.

* * * * *